(12) United States Patent
Halir et al.

(10) Patent No.: US 11,644,612 B2
(45) Date of Patent: May 9, 2023

(54) WAVEGUIDE, MANUFACTURING METHOD OF SAID WAVEGUIDE AND POLARISATION SPLITTER WHICH MAKES USE OF SAID WAVEGUIDE

(71) Applicants: UNIVERSIDAD DE MALAGA, Malaga (ES); CONSEJO SUPERIOR DE INVESTIGACIONES CIENTIFICAS, Madrid (ES)

(72) Inventors: Robert Halir, Malaga (ES); Jose Manuel Luque Gonzalez, Malaga (ES); Alaine Herrero Bermello, Madrid (ES); Alejandro Ortega Monux, Malaga (ES); Inigo Molina Fernandez, Malaga (ES); Juan Gonzalo Wanguemert Perez, Malaga (ES); Aitor Villafranca Velasco, Madrid (ES)

(73) Assignees: UNIVERSIDAD DE MALAGA, Malaga (ES); CONSEJO SUPERIOR DE INVESTIGACIONES CIENTIFICAS, Madrid (ES)

( * ) Notice: Subject to any disclaimer, the term of this patent is extended or adjusted under 35 U.S.C. 154(b) by 124 days.

(21) Appl. No.: 17/255,937

(22) PCT Filed: Jun. 27, 2019

(86) PCT No.: PCT/ES2019/070452
§ 371 (c)(1),
(2) Date: Dec. 23, 2020

(87) PCT Pub. No.: WO2020/002739
PCT Pub. Date: Jan. 2, 2020

(65) Prior Publication Data
US 2021/0263210 A1 Aug. 26, 2021

(30) Foreign Application Priority Data

Jun. 29, 2018 (ES) .............................. ES201830653

(51) Int. Cl.
*G02B 6/028* (2006.01)
*G02B 5/18* (2006.01)
*F21V 8/00* (2006.01)

(52) U.S. Cl.
CPC ......... *G02B 6/0056* (2013.01); *G02B 5/1833* (2013.01); *G02B 6/0288* (2013.01)

(58) Field of Classification Search
None
See application file for complete search history.

(56) References Cited

U.S. PATENT DOCUMENTS 5,090,790 A 2/1992 Zucker
5,838,842 A 11/1998 Mackie
(Continued)

FOREIGN PATENT DOCUMENTS

CN 106959485 A 7/2017
ES 2379058 A1 4/2012
(Continued)

OTHER PUBLICATIONS

A. Maese-Novo et al., "Wavelength Independent Multimode Interference Coupler", Department of Engineering of Communications, ETSI Telecommunications, University of Malaga, Mar. 25, 2013, 9 pages, vol. 21, No. 6, Optical Society of America.
(Continued)

*Primary Examiner* — Chris H Chu

(57) ABSTRACT

The invention relates to a waveguide and a polarisation splitter based on said waveguide, in which a rotation of an angle greater than zero is applied to a plurality of sections of a core material and a plurality of sections of a covering material, thereby achieving an independent control of the
(Continued)

refractive indices of a zero-order transverse electric mode and a zero-order transverse magnetic mode. This document also describes a manufacturing method of said waveguide which allows the birefringence of the light that passes through the waveguide.

18 Claims, 4 Drawing Sheets

(56) References Cited

U.S. PATENT DOCUMENTS

| | | | |
|---|---|---|---|
| 2003/0174982 | A1 | 9/2003 | Ridgway et al. |
| 2016/0091664 | A1* | 3/2016 | Doany .................. G02B 6/34 385/37 |
| 2021/0033789 | A1* | 2/2021 | Villafranca Velasco .................. G02B 5/1809 |

FOREIGN PATENT DOCUMENTS

| | | | |
|---|---|---|---|
| ES | 2722753 | A1 | 8/2019 |
| JP | 05289121 | A | 3/2001 |

OTHER PUBLICATIONS

Dirk Taillaert et al., "A Compact Two-Dimensional Grating Coupler Used as a Polarization Splitter", IEEE Photonics Technology Letters, Sep. 9, 2003, pp. 1249-1251, vol. 15, No. 9.

Erez Hasman et al., "Polarization Beam-Splitters and Optical Switches Based on Space-Variant Computer-Generated Subwavelength Quasi-Periodic Structures", Optics Communications, Aug. 1, 2002, pp. 45-54, vol. 209.

Jose Manuel Luque-Gonzalez et al., "Tilted Subwavelength Gratings: Controlling Anisotropy in Metamaterial Nanophotonic Waveguides", Optics Letters, Oct. 1, 2018, pp. 4691-4694, vol. 43, No. 19, Optical Society of America.

Yule Xiong et al., "Polarization Splitter and Rotator with Subwavelength Grating for Enhanced Fabrication Tolerance", Optics Letters, Dec. 15, 2014, pp. 6931-6934, vol. 39, No. 24.

Yule Xiong et al., "High Extinction Ratio and Broadband Silicon TE-Pass Polarizer Using Subwavelength Grating Index Engineering", IEEE Photonics Journal, Oct. 2015, 8 pages, vol. 7, No. 5.

Alaine Herrero-Bermello et al., "Design of a Broadband Polarization Splitter Based on Anisotropy-Engineered Tilted Subwavelength Gratings", IEEE Photonics Journal, Jun. 2019, 9 pages, vol. 11, No. 3.

* cited by examiner

WAVEGUIDE, MANUFACTURING METHOD OF SAID WAVEGUIDE AND POLARISATION SPLITTER WHICH MAKES USE OF SAID WAVEGUIDE

OBJECT OF THE INVENTION

The present invention relates to the field of integrated optics, and more specifically, to devices based on waveguides with sub-wavelength structures.

BACKGROUND OF THE INVENTION

The birefringence of photonic platforms, meaning the difference in behaviour between transverse electric polarisation (TE) and transverse magnetic polarisation (TM) in devices based on waveguides, is one of the biggest challenges for the development and expansion of integrated optics. In particular there are two main ways to approach this problem: making structures that are polarisation-independent (meaning with the same effective index and/or dispersive characteristics for TE and for TM) or developing polarisation-splitting devices (meaning devices that separate the TE and TM modes into two output guides, independently processing them afterwards, or discarding one of them).

Regardless of the alternative followed (polarisation-independent or polarisation-selective), the difficulty arises when manipulating the birefringence of the waveguides used, either to match the response of the TE and TM modes or to make it so unequal so as to allow for the separation thereof. In general, given the design constraints obtainable by means of the geometric modification of a single material and etch depth, most solutions in the state of the art are based on the incorporation of additional materials to the core material of the waveguide, or on the use of structures with multiple layers or etch depths. However, these alternatives significantly increase the manufacturing complexity of the devices.

For example, U.S. Pat. No. 5,090,790 presents a first polarisation-independent waveguide wherein multiple quantum well layers are introduced in the guide to control the birefringence of the same. In a second example, US 2003/174982 A1 presents an alternative polarisation-independent waveguide wherein an electro-optical coating is deposited, controlled by a set of electrodes that generate a modified magnetic field around the core of the guide, the active control of which allows the effective indices of the TE and TM modes to be matched. As can be seen, in both cases it is necessary to use complex manufacturing and control processes, requiring materials and geometries that are not able to be used with single-exposure manufacturing systems.

With regard to polarisation splitters, different phenomena, materials and optical structures have been proposed with the aim of implementing said polarisation splitters. Noteworthy among the alternatives proposed are sub-wavelength diffraction gratings, photonic crystals, the negative refraction present in said crystals or form birefringence (intrinsic of the materials). However, all of these configurations have serious problems in the manufacturing thereof, either due to a heightened sensitivity to deviations with respect to nominal designs, which are inevitable during the manufacturing process, or due to the fact that they require geometries or auxiliary elements that cannot be implemented by the normal manufacturing methods of commercial photonic chips.

One possible solution to the previously mentioned manufacturing limitations is the use of multimode interference (MMI) couplers. For example, U.S. Pat. No. 5,838,842 has an MMI for polarisation splitting in integrated devices. The MMI has a multimode waveguide region (also known as a "slab") in which self-imaging of the transverse electric (TE) and transverse magnetic (TM) modes is generated at different lengths. Said lengths are determined by the differences in the propagation constants of both modes in the multimode waveguide region. However, given that the multimode waveguide region is a continuous waveguide, the differences between the propagation constants are small and hard to control, resulting in devices that are hardly efficient and require large propagation distances in the multimode waveguide region, thereby leading to an increased total size of the device.

It must be noted that multimode interference (MMI) couplers have also been used conventionally for power splitting, in other words, instead of separating two polarisations into two output waveguides, part of the power of a single polarisation is separated into two or more output waveguides. The features of MMI as power splitters, and particularly the losses and the bandwidth thereof, have been improved by means of the use of sub-wavelength grating (SWG) structures, as shown in patent ES 2,379,058. It must be noted that the SWG structures of said power splitter, in addition to the fact that they are perpendicular to the input and output waveguides, are designed to operate in a wide bandwidth at a single polarisation. That is to say, the geometric parameters of said SWG structure are selected so that the bandwidth of the device is optimised at one polarisation, the device being inoperative at the orthogonal polarisation. Specifically, the birefringence of the multimode waveguide region implies different beat lengths for the TE and TM polarisations, and thus the positions of the MMI in which power splitting is verified are different for each polarisation, preventing the joint removal thereof. Meaning, in these types of devices, the birefringence and the anisotropy of the SWG structure are not controllable during design, but rather are a consequence of the geometric parameters thereof.

Another possible alternative are directional couplers, in which a lateral coupling is produced between two adjacent single mode guides. However, for this coupling to be polarisation-selective, and not merely power splitting (in other words, so that it only affects the TE or TM mode, while the other mode continues to propagate without alterations in the waveguide through which it has been introduced), it is still necessary to control the birefringence of at least one of the single mode guides of which it is made up. Said control can be done by depositing additional materials and/or active elements, with the previously mentioned drawbacks that said option entails, or, as exemplified in CN 106,959,485 A, by means of the use of SWG structures.

In the case of CN 106,959,485 A, the SWG structure is etched in a side of one of the single mode guides by means of slits perpendicular to the direction of propagation of light that only partially occupy the core of said guide. However, this geometry provides very limited control of the birefringence of the guide, given that the effects on the TE and TM modes of the structure continue to be linked to each other. This limitation, when independently implementing the effective indices of the TE and TM modes, leads to reduced features with regard to insertion losses, extinction ratio and bandwidth. Additionally, the response of this structure can only be adjusted by modifying the period and duty cycle thereof, which can affect the minimum feature size of the device and therefore does not affect the manufacturing difficulty thereof.

Thus, in the state of the art there is still a need for waveguide structures that are able to provide an efficient and compact polarisation control with a large bandwidth, and without increasing the manufacturing complexity of the devices.

DESCRIPTION OF THE INVENTION

The present invention solves the previously mentioned problems by means of a single mode waveguide with a SWG structure that is rotated a rotation angle with respect to the propagation direction of the guided light, which allows the birefringence properties of said guide to be modified. The single mode guide herein described can be integrated together with any other combination of devices in a photonic chip, able to be manufactured in the same exposure step as the rest of said devices (unlike other polarisation-independent guides or polarisation splitters that require multiple etch depths, inclined walls, additional materials, etc.).

In a first aspect of the invention, a modified birefringence guide device is presented, "modified birefringence" being understood not as a real time control of the birefringence of the wave guide, but as a constant alteration of said birefringence with respect to that of a traditional continuous waveguide, said alteration being controllable during a previous guide design phase by means of the selection of the geometric properties of the same, and in particular, of an angle of a SWG structure. The modified birefringence guide device makes use of a modified birefringence waveguide, therefore comprising a SWG structure formed by alternate arrangement of a plurality of sections of a core material and a plurality of sections of a covering material, with a smaller period than the wavelength of the light guided by said modified birefringence waveguide. In particular, the SWG structure is rotated an angle greater than zero with respect to the propagation direction of the light. In other words, the interfaces between the sections of covering material and the sections of core material have said angle with a plane that is perpendicular to the axis of the light propagation. Said angle allows a first effective index for the zero-order transverse electric mode and a second effective index for the zero-order transverse magnetic mode to be independently controlled.

It must be noted that although other SWG geometric parameters, such as the period or the filling factor can affect the resulting birefringence or anisotropy, said effect is significantly less than that which is produced by the rotation of the interfaces, thereby limiting the features able to be obtained by the splitter. Moreover, it is significant that, unlike said parameters (period and filling factor), the rotation angle does not affect the minimum feature size of the device, and therefore it does not increase the manufacturing difficulty thereof.

It is likewise noteworthy that the specific angle for which a specific characteristic related to the birefringence is obtained (for example, a specific condition between the first effective index for the zero-order transverse electric mode and the second effective index for the zero-order transverse magnetic mode) depends on the rest of material and morphological characteristics of the guide, such as the height, width, core material, covering material, SWG period and SWG filling factor thereof. Thus, said specific angle is preferably determined in a previous design phase according to the method of the third aspect of the present invention.

Preferably, said specific conditions obtained by means of the selection of the rotation angle of the SWG structure can comprise both polarisation-independent behaviour (meaning one same value for the first effective index of the zero-order transverse electric mode and for the second effective index of the zero-order transverse magnetic mode) and polarisation-selective behaviour (meaning a value that is significantly different for the first effective index of the zero-order transverse electric mode and for the second effective index of the zero-order transverse magnetic mode.

Also preferably, depending on the specific embodiment, the geometric parameters (width, period, filling factor, angle) of the SWG structure of the modified birefringence waveguide can either remain constant throughout the whole guide, or be modified in a gradual or abrupt way throughout said guide, thereby obtaining different birefringent properties in different positions of the guide.

The geometry of the sections of core material can also vary among implementations. In particular, three preferred options include:

- A segment for each section, entirely separated from each other by the covering material. Preferably, each segment has a mainly rectangular or trapezoidal shape (seen on a plane parallel to an interface between a layer of core material and a layer of support material).
- Multiple segments for each section, each pair of segments of one same section being separated by a slit or channel of covering material.
- Sections connected to each other by means of a plurality of central attachments of core material, of either constant or variable width.

The modified birefringence waveguide is preferably implemented in silicon on insulator (SOI) with a covering material preferably selected among air (meaning, a covering layer is not included during the manufacturing and the air of the environment where the waveguide is applied acts as a covering material), silicon dioxide and a polymer. More preferably, in the case of using a polymer as a covering material, said polymer is selected such that it has an effective index variation with the temperature with a sign opposite to the silicon variation. In other words, by applying a temperature change, the modification in the effective indices of the SWG structure caused by the covering and the core have opposite signs, thereby mitigating the response variability of the guide with respect to environmental changes.

With the aim of optimising the insertion losses in input and output transitions of the modified birefringence single mode guide (for example, in an interface with a conventional continuous waveguide, or with a SWG guide without rotation), said modified birefringence waveguides preferably comprise at least one modal adapter. The modal adapters comprise SWG structures with a variable width and/or a progressive rotation between a direction perpendicular to the waveguide and the rotation angle of the SWG structure. Also preferably, the modal adapters comprise a central bridge with a width that is inversely proportional to the width of the adapter. For example, if a continuous waveguide with a first width is connected by means of the modal adapter to a modified birefringence waveguide with a second width, said modal adapter progressively increases the width thereof from said first width to said second width, while the central bridge progressively reduces from said first width to a third width (less than the first width), or until completely disappearing at the end of the modal adapter.

In a second aspect of the invention, a polarisation splitter system is presented which is based on a polarisation-selective directional coupling, made up from the modified birefringence single mode waveguide of the first aspect of the invention. The device comprises two adjacent single mode guides (which we will call first guide and second guide), such that when a zero-order transverse magnetic mode is introduced through the first guide, a coupling to the second guide is produced; while when a zero-order transverse electric mode is introduced through the first guide, said coupling to the second guide is not produced.

To achieve said polarisation-selective behaviour, at least the second single mode guide comprises a SWG structure, the interfaces of which between the plurality of core material sections and the plurality of covering material sections form an angle greater than zero with a plane that is perpendicular to a propagation direction of guided light. Depending on the specific implementation, the first single mode guide can be a continuous waveguide, a SWG waveguide with interfaces perpendicular to the propagation direction, or a rotated SWG waveguide with geometric properties (width, rotation angle, period and/or filling factor) that are different from those of the second waveguide.

Preferably, the polarisation-selective behaviour can be enhanced even by means of an auxiliary central structure arranged between the first single mode wave guide and the second single mode wave guide. Specifically, said auxiliary structure can be a homogeneous segment of core material, a homogeneous segment of a material different from the core material, or a heterogeneous structure that combines multiple materials (for example a metamaterial or a SWG structure).

The control of birefringence provided by the waveguide of the first aspect of the invention, by being applied in the polarisation-splitting system by the directional coupling described, allows the dimensions of the system to be reduced, at the same time that the rest of the features (insertion losses, extinction ration, bandwidth, etc.) are optimised.

In a third aspect of the invention, a manufacturing method of the modified birefringence waveguide of the first aspect of the invention and, thus, of the polarisation splitter system of the second aspect of the invention, is presented. Given the geometric parameters and/or materials of the SWG structure (for example, width, height, duty cycle, period, covering material, core material), the method comprises determining a rotation angle of the SWG structure to obtain the objective ratio between the first effective index for the zero-order transverse electric mode and a second effective index for the zero-order transverse magnetic mode. Said objective ratio can be, for example, obtaining one same value for the first effective index and the second effective index (polarisation-independent guides), or obtaining a difference greater than a specific threshold between the value of the first effective index and the value of the second effective index (polarisation-selective guides). It must be noted that the geometric and/or material parameters of the SWG structures can be fixed parameters or be iteratively modified within an optimisation process. It must likewise be noted that both the polarisation-independent behaviour and the polarisation-selective behaviour can be obtained for the same geometric and/or material parameters of the SWG structure, simply by modifying the rotation angle of the SWG structure. However, the particular values of the angle for said purposes will depend on the specific values of said geometric and/or material parameters of the SWG structure.

The calculation of the angle to introduce in the manufactured SWG structure is done by means of numerical computations of the effective indices generated by the SWG structure rotated for said angle. Specifically, said numerical computations can be performed by means of an algorithm selected from among the photonic simulation algorithms known in the state of the art, although preferably, an approximation of the SWG structure is recommended by means of a rotation of a diagonal tensor of homogeneous anisotropic medium, thereby reducing the computational load of the method.

In particular, the method preferably comprises characterising the SWG structure rotated by means of a rotated tensor ($\tilde{n}$) according to the following expression:

$$\tilde{n} = \begin{bmatrix} \tilde{n}_{xx} & 0 & \tilde{n}_{xz} \\ 0 & \tilde{n}_{yy} & 0 \\ \tilde{n}_{xz} & 0 & \tilde{n}_{zz} \end{bmatrix}$$

where :

$$\tilde{n}_{xx} = \sqrt{n_{xx}^2 \cos^2(\alpha) + n_{zz}^2 \sin^2(\alpha)},$$

$$\tilde{n}_{yy} = n_{yy},$$

$$\tilde{n}_{zz} = \sqrt{n_{xx}^2 \sin^2(\alpha) + n_{zz}^2 \cos^2(\alpha)},$$

$$\tilde{n}_{xz} = \sqrt{(n_{zz}^2 - n_{zz}^2)\sin(\alpha)\cos(\alpha)},$$

[$n_{xx}$, $n_{yy}$, $n_{zz}$] being components of the diagonal tensor (n) of a homogeneous anisotropic medium (meaning, the SWG structure without rotating).

The waveguide, polarisation splitter and design method described therefore provide a compact birefringence control, with low losses and high bandwidth, able to be manufactured in a single lithography step. In other words, the improvement of the features is not associated with an increase in manufacturing complexity. These and other advantages of the invention will become apparent in the light of the detailed description of the same.

DESCRIPTION OF THE FIGURES

With the aim of helping improve the comprehension of the features of the invention according to a preferred practical embodiment thereof, and to complement this description, the following figures are attached as an integral part of the same, with an illustrative and non-limiting character.

PREFERRED EMBODIMENT OF THE INVENTION

Note that the preferred embodiments of the device (modified birefringence single mode waveguide) and of the associated system thereof (polarisation splitter based on said guide) object of the invention is preferably implemented in silicon on insulator (SOI) to thus benefit from the high contrast of the SOI index. However, specific embodiments could be implemented in other different photonic platforms. In other words, all of the waveguides of the device are preferably made by means of a silicon core, deposited on an insulating layer, such as silicon dioxide. The covering material can vary for different embodiments of the invention, some of the possibilities being silicon dioxide, polymers or air, without this list limiting the use of other possible options.

Likewise, it must be noted that the preferred embodiments of the polarisation splitter of the invention are described with the system operating as a polarisation splitter. However, the same system can operate in a reciprocal manner as a polarisation multiplexer, in other words, combining two orthogonal polarisation signals of two input guides in a single output guide, simply by reversing the operating direction of the device.

With regard to the manufacturing of the devices proposed, it must be noted that the sub-wavelength grating (SWG) structures, independent of the rotation angle thereof with respect to the optical axis, do not increase the difficulty or the number of steps with respect to the manufacturing of conventional waveguides. In other words, all of the structures used by the polarisation splitter of the invention can be manufactured in a single exposure step at a complete depth with any conventional microelectronic etching technique, for example by means of exposure to e-beams or deep-UV.

Figure 1:
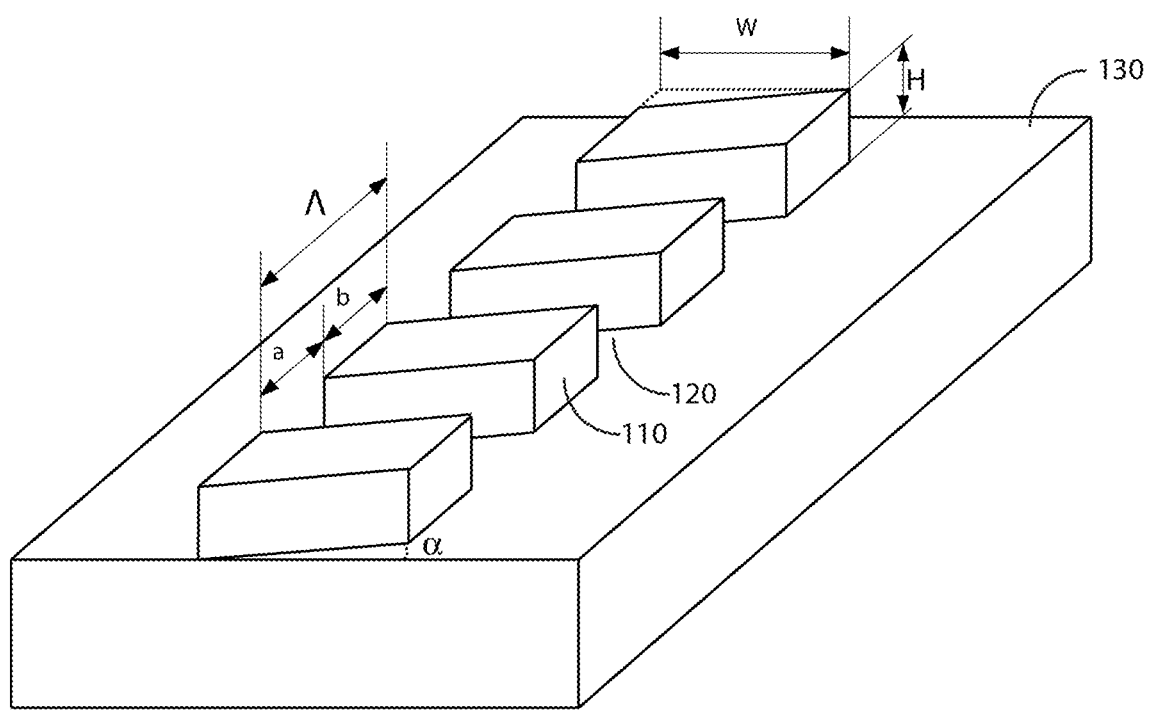
FIG. 1 schematically shows, in a perspective view, birefringence waveguides modified by means of the rotation of sub-wavelength grating structures according to a preferred embodiment of the invention, illustrating the main geometric parameters of said structure.

FIG. 1 shows a schematic view of a preferred embodiment of a waveguide (100), preferably single mode, which allows the birefringence of the light that passes through at least part of said waveguide (100) object of a first aspect of the invention to be modified, likewise used in a preferred embodiment of the polarisation splitter (200) object of a second aspect of the invention, as well as the main geometric parameters thereof.

The waveguide (100) is formed by a periodic alternative arrangement of sections of a core material (110) and sections of a covering material (120) with a period ($\Lambda$) smaller than the wavelength of a light propagated by said periodic arrangement of the waveguide (100); further having, arranged between the sections of core material (110) and sections of a covering material (120), interfaces that are rotated an angle ($\alpha$) with respect to a plane perpendicular to the propagation direction of the light (meaning, perpendicular to the main axis of the waveguide). The core material sections (110) of the wave guide (100) have a height (H) and a width (W) and are arranged on a support material (130) which acts as an insulating layer. On this structure, a filling factor or duty cycle (f) is defined as the ratio between the proportion of covering material (a) and the proportion of core material (b) within a period ($\Lambda$). The specific values of all of these geometric parameters are defined prior to the manufacturing of the device by means of numeric simulations according to that described by the method of the invention.

Specifically, the waveguide (100) is preferably modeled as a rotated tensor ($\tilde{n}$) according to the following expression:

$$\tilde{n} = \begin{bmatrix} \tilde{n}_{xx} & 0 & \tilde{n}_{xz} \\ 0 & \tilde{n}_{yy} & 0 \\ \tilde{n}_{xz} & 0 & \tilde{n}_{zz} \end{bmatrix}$$

where:

$$\tilde{n}_{xx} = \sqrt{n_{xx}^2 \cos^2(\alpha) + n_{zz}^2 \sin^2(\alpha)},$$

$$\tilde{n}_{yy} = n_{yy},$$

$$\tilde{n}_{zz} = \sqrt{n_{xx}^2 \sin^2(\alpha) + n_{zz}^2 \cos^2(\alpha)},$$

$$\tilde{n}_{xz} = \sqrt{(n_{zz}^2 - n_{zz}^2)\sin(\alpha)\cos(\alpha)},$$

[$n_{xx}$, $n_{yy}$, $n_{zz}$] being components of a diagonal tensor (n) of the homogeneous anisotropic medium equivalent to the SWG structure without rotating (meaning, with interfaces perpendicular to the main axis of the waveguide). This modeling can provide a final value of the angle ($\alpha$), or serve as a first approximation, refined in a second calculation step by means of a complete simulation (meaning, without approximations of SWG structures as homogeneous means) of the structure.

Figure 2:
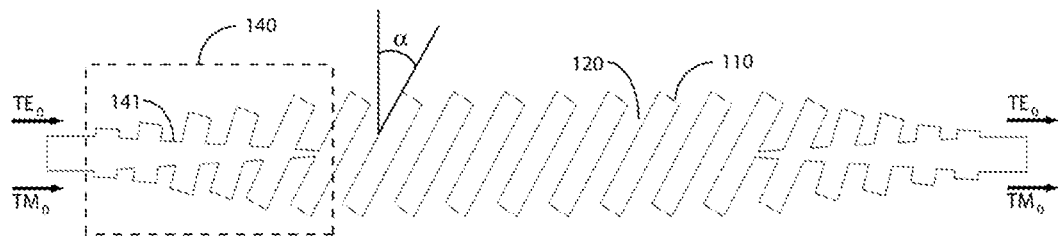
FIG. 2 illustrates, in an upper view, a preferred embodiment of the modified birefringence waveguide of the invention, wherein the rotation angle is selected such that a polarisation-independent behaviour is obtained.

FIG. 2 shows a schematic upper view of a preferred embodiment of the waveguide (100) of the invention (meaning, a view on a plane parallel to the interface between the support (130) and the core (110), and in which the light therefore propagates following the horizontal direction of the figure). The waveguide (100) has an effective index ($n_{TE}$) for the zero-order transverse electric mode ($TE_0$) and a second effective index ($n_{TM}$) for the zero-order transverse magnetic mode ($TM_0$) for each wavelength ($\lambda$). Depending on the angle ($\alpha$), for specific geometric and material conditions, the first effective index ($n_{TE}$) can be equal to the second effective index ($n_{TM}$), or significantly different from said second effective index ($n_{TM}$). The necessary difference in order for it to be considered a "significantly different" value depends on the specific application of the device, but in general, this expression must be understood as a difference of propagation characteristics that allows for differential processing of the $TE_0$ y $TM_0$ modes. For example, in the case of using the waveguide (100) for implementing a polarisation splitter (200), "significantly different" is understood as an effective index difference that gives rise to the lateral coupling of the $TM_0$ mode between adjacent guides, while said coupling does not occur in the $TE_0$ mode (due to a greater first effective index of said $TE_0$ mode with respect to the second effective index of the $TM_0$ mode and, thus, a smaller modal diameter).

With the aim of reducing the reflection losses in the interfaces of the waveguide (100), said waveguide (100) can comprise a modal adapter (140) on each end. Each modal adapter (140) has at least one SWG structure with the same period ($\Lambda$) and duty cycle (f) as the waveguide (100), while the width thereof progressively varies from the width of a single mode waveguide to a final width of a modal adapter (140), preferably greater than the width of the single mode waveguide, and thus, preferably, the SWG structures of the modal adapter (140) have an incremental width. Each modal adapter (140) likewise comprises a central bridge (141), which is a small connector made of core material in the center of the sections of covering material (120). The width of the central bridge reduces as the total width of the respective modal adapter (140) increases, completely disappearing in the interface with the rotated SWG structure. Note that the specific geometry of the modal adapter (140) can vary between implementations, as long as a progressive and smooth modal transition is guaranteed.

Figure 3:
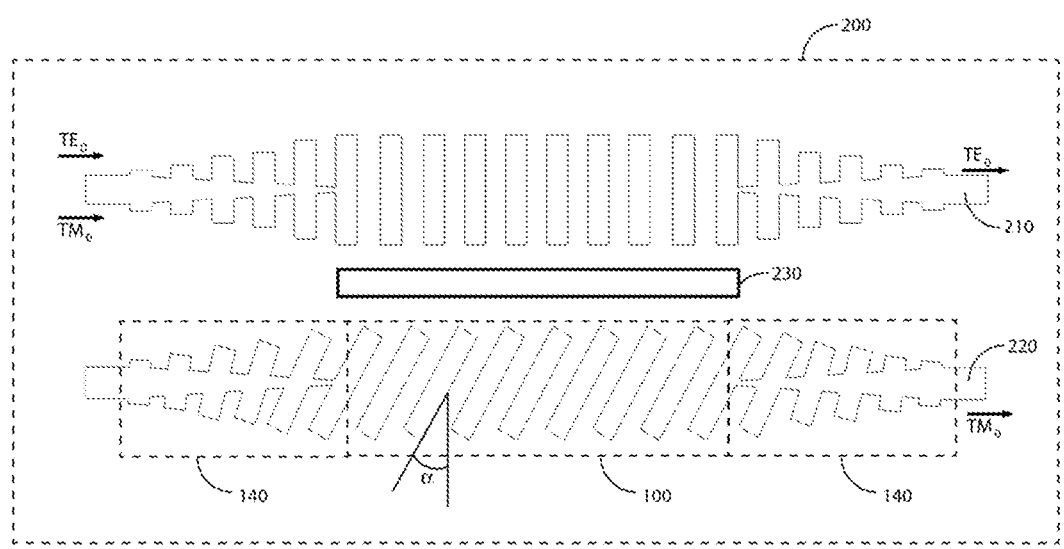
FIG. 3 shows an integrated polarisation splitter based on directional coupling with a modified birefringence waveguide, according to a preferred embodiment of the invention.

FIG. 3 shows a specific embodiment of a polarisation splitter (200) corresponding to a second aspect of the invention and comprises a directional coupler which, in turn, comprises, preferably adjacently arranged, a first single mode guide (210) and a second single mode guide (220), said second single mode guide (220) being a specific embodiment of the waveguide (100) of the first aspect of the invention. In this case, the first single mode guide (210) is a SWG waveguide with interfaces perpendicular to the axis of the guided light, with modal adapters (140) located on the ends thereof, although in other embodiments of the invention, the first single mode guide (210) can be a continuous waveguide or comprise SWG structures with other alternative geometries.

Additionally, the polarisation splitter (200) can comprise a central structure (230) arranged between the first single mode guide (210) and the second single mode guide (220), which allows the polarisation-selective properties of the system to be enhanced and the features thereof to be improved. In this example, the central structure (230) is simply a rectangular segment, preferably homogeneous of the same material as the sections of core material (110). However, in other specific embodiments, the central structure (230) can be implemented by means of other alternative geometries and/or materials.

During the operation as a polarisation splitter (200), the $TE_0$ and $TM_0$ modes are introduced in the same input of the first single mode waveguide (210). While the $TM_0$ mode couples to the second single mode waveguide (220), following the general behaviour of any directional coupler, the $TE_0$ mode is confined to the first single mode guide (210), thereby obtaining a highly efficient polarisation split in an extremely reduced size.

The manufacturing process of the polarisation splitting system (200) is preferably carried out by means of a photonic simulation process consisting of two steps. In a first step, a first approximation of the design is obtained by a simulation of the SWG structure as a homogeneous and anisotropic material. The anisotropic material used is defined by a dielectric tensor, obtained by means of Rytov approximation. Establishing these starting parameters, photonic simulations are carried out for a sweep of rotation angles ($\alpha$), modeling the effect of said rotation by means of the expressions described for the waveguide (100). This first approximation allows simulations to be carried out in three dimensions reducing the computational time and cost of the simulation.

Once the anisotropic properties are modeled at different angles for the specific geometry and platform under analysis, said modeling is applied to a first optimisation by means of a sweep of different parameters, such as the width of the multimodal zone, the duty cycle of the corresponding real SWG structure or the length of the polarisation splitter. Said first optimisation process is done by executing sweeps of the aforementioned parameters and imposing as objectives the minimization of total insertion losses. As a result of this optimisation, an approximation of the initial design parameters (angle, separation between guides, period, duty cycle and length of the device) is obtained.

From the design parameters obtained in the first step, the physical modeling of the complete SWG structure (without approximations to the homogeneous medium) is then carried out, which provides us with the final design of the polarisation splitter (200). Although this process can be done maintaining the degrees of freedom of all the design parameters, it is recommended that this second optimisation process be simplified in order to reduce the computational load of the same, establishing the width of the multimodal zone, the duty cycle, and the period (always imposing that said period be outside the Bragg regime, determined by the proportionality ratio between the period of the SWG structure and the effective wavelength of the light propagated by said structure). This second optimisation process is preferably done using three-dimensional finite difference time domain methods (FDTD), although other photonic computational techniques may likewise be applied to the same.

Figure 4:
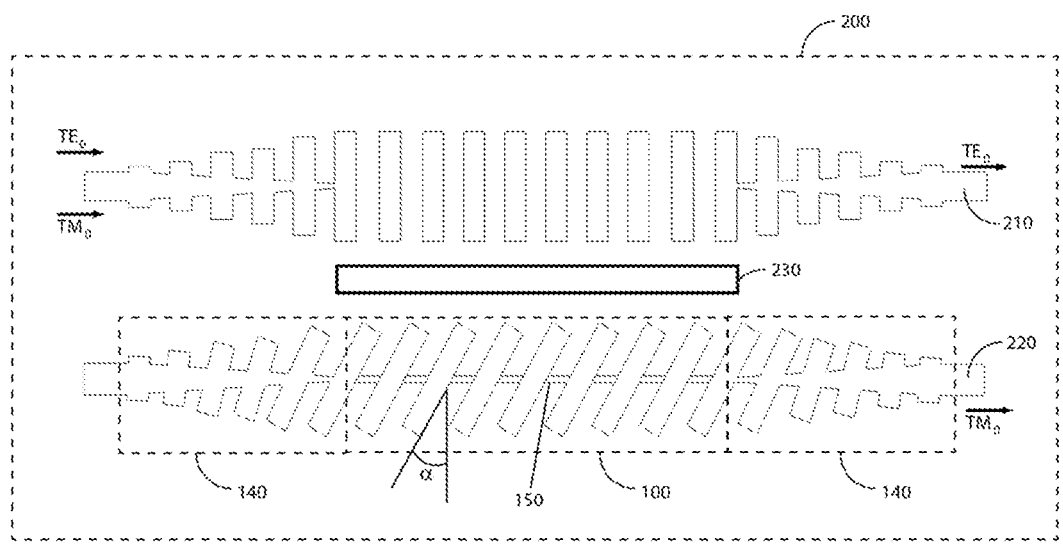
FIG. 4 illustrates the effect of the rotation angle on the anisotropic properties of a SWG structure.

FIG. 4 shows a variant of the polarisation splitter (200) of the invention, wherein the waveguide (100) with which the second waveguide (220) is implemented comprises a plurality of central attachments (140) that connect the sections of core material (110) of the SWG structure. The plurality of central attachments (140), and specifically the selection of the width thereof provides an additional degree of freedom in the design of the polarisation splitter (200), increasing the tuning of the first effective index ($n_{TE}$) for the zero-order transverse electric mode ($TE_0$) and of the second effective index ($n_{TM}$) for the zero-order transverse magnetic mode ($TM_0$).

Figure 5:
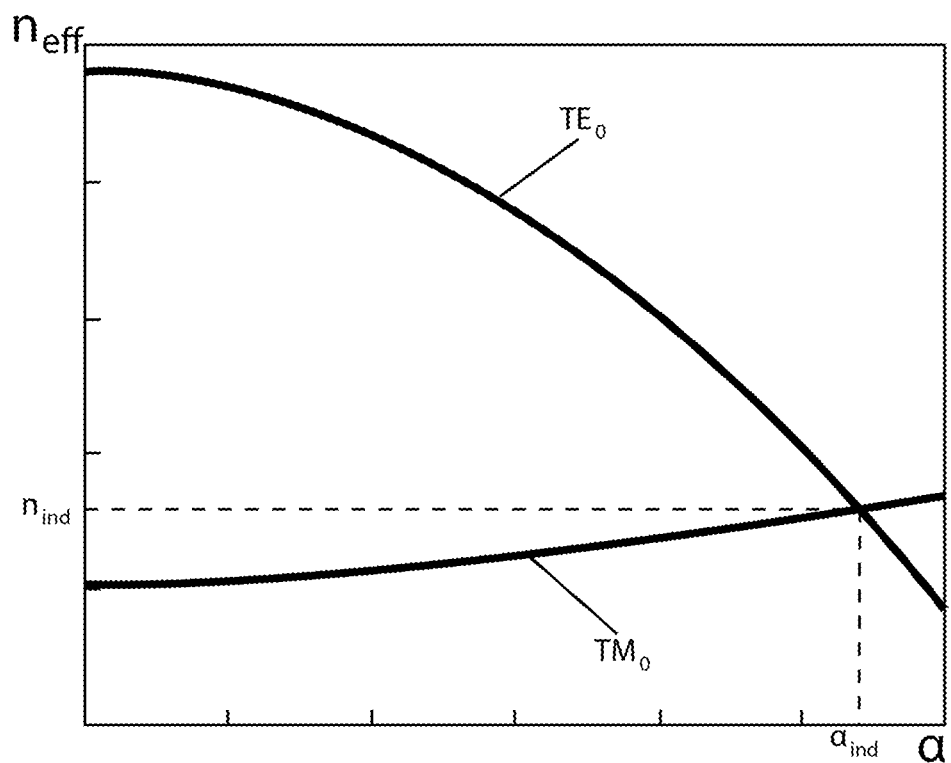
FIG. 5 illustrates a chart showing the variation of the first effective index ($n_{TE}$) for the zero-order transverse electric mode (TE$_0$) and a second effective index ($n_{TM}$) for the zero-order transverse magnetic mode (TM$_0$) based on the rotation angle ($\alpha$) of the SWG structure.

Lastly, FIG. 5 schematically shows a variation of the first effective index ($n_{TE}$) for the zero-order transverse electric mode ($TE_0$) and a second effective index ($n_T$) for the zero-order transverse magnetic mode ($TM_0$) based on the rotation angle ($\alpha$) of the SWG structure. In spite of the fact that the specific dependencies of these indices with the angle ($\alpha$) vary based on the materials used and the rest of the geometric properties, it must be mentioned that the effect of said rotation is greater for the $TE_0$ mode than for the $TM_0$ mode, and furthermore the variation thereof have opposite signs. This allows, on the one hand, the properties of the first effective index ($n_{TE}$) to be altered without hardly modifying the response of the second effective index ($n_{TM}$), thereby developing polarisation-selective devices; and on the other hand, determining an angle for polarisation independence ($\alpha_{ind}$) in which it is verified that both the first effective index ($n_{TE}$) and the second effective index ($n_{TM}$) are equal to each other, taking a value of the polarisation-independent effective index ($n_{ind}$).

In light of this description and figures, a person skilled in the art will be able to understand that the invention has been described according to some preferred embodiments of the same, but multiple variations may be introduced in said preferred embodiments, without detracting from the object of the invention as claimed.

The invention claimed is:

1. A waveguide (100) comprising a plurality of sections of a core material (110) and a plurality of sections of a covering material (120) alternately arranged in a periodic way with a period ($\Lambda$) smaller than the wavelength ($\lambda$) of a light guided through the waveguide (100);
   wherein the waveguide (100) is single mode and comprises interfaces respectively defined between each one of the sections of the plurality of sections of core material (110) and each one of the sections of the plurality of sections of covering material (120) forming an angle ($\alpha$) greater than zero with respect to a plane perpendicular to a propagation direction of the light intended to be guided by the waveguide (100), and wherein the plurality of sections of core material (110) and the plurality of sections of covering material (120) have constant geometric properties throughout the length of the waveguide (100).

2. The waveguide (100) according to claim 1, wherein the angle ($\alpha$) is selected such that a first effective index ($n_{TE}$) of a zero-order transverse electric mode ($TE_0$) is different from a second effective index ($n_{TM}$) of a zero-order transverse magnetic mode ($TM_0$).

3. The waveguide (100) according to claim 1, wherein the angle ($\alpha$) is selected such that a first effective index ($n_{TE}$) of a zero-order transverse electric mode ($TE_0$) is equal to a second effective index ($n_{TM}$) of a zero-order transverse magnetic mode ($TM_0$).

4. The waveguide (100) according to claim 1, wherein the plurality of sections of core material (110) have at least one inner groove of covering material.

5. The waveguide (100) according to claim 1, wherein the plurality of sections of core material (110) have a plurality of central attachments (150) of core material.

6. The waveguide (100) according to claim 1, wherein the material of the sections of core material (110) is silicon.

7. A polarisation splitter (200), comprising a first waveguide (210) and a second waveguide (220) adjacently arranged at a distance (d);
wherein the second waveguide (220) comprises a plurality of sections of a core material (110) and a plurality of sections of a covering material (120) alternately arranged in a periodic way with a period (Λ) smaller than the wavelength (λ) of a light guided through the waveguide (100); and
wherein the second waveguide (220) is single mode and comprises interfaces respectively defined between each one of the sections of the plurality of sections of core material (110) and each one of the sections of the plurality of sections of covering material (120) forming an angle (α) greater than zero with respect to a plane perpendicular to a propagation direction of the light intended to be guided by the waveguide (100), and wherein the plurality of sections of core material (110) and the plurality of sections of covering material (120) have constant geometric properties throughout the length of the waveguide (100).

8. The polarisation splitter (200) according to claim 7, wherein the first waveguide (210) is a continuous waveguide.

9. The polarisation splitter (200) according to claim 7, wherein the first waveguide (210) is a waveguide with a plurality of sections of a core material (110) and a plurality of sections of a covering material (120) alternately arranged in a periodic way with a period (Λ) smaller than the wavelength (λ) of the guided light.

10. The polarisation splitter (200) according to claim 7, further comprising a central structure (230) arranged between the first waveguide (210) and the second waveguide (220).

11. The polarisation splitter (200) according to claim 10, wherein the central structure (230) is a homogeneous segment of core material.

12. The polarisation splitter (200) according to claim 10, wherein the central structure (230) is a homogeneous segment of a material different than the core material.

13. The polarisation splitter (200) according to claim 10, wherein the central structure (230) is a heterogeneous structure that combines multiple materials.

14. A waveguide (100) comprising a plurality of sections of a core material (110) and a plurality of sections of a covering material (120) alternately arranged in a periodic way with a period (Λ) smaller than the wavelength (λ) of a light guided through the waveguide (100);
wherein the waveguide (100) is single mode and comprises interfaces respectively defined between each one of the sections of the plurality of sections of core material (110) and each one of the sections of the plurality of sections of covering material (120) forming an angle (α) greater than zero with respect to a plane perpendicular to a propagation direction of the light intended to be guided by the waveguide (100);
wherein the waveguide (100) further comprises at least one modal adapter (140) connected to an input of the waveguide (100), said at least one modal adapter (140) comprising a plurality of sections of core material (110) and sections of covering material (120) arranged in an alternated and periodic way with a period (Λ) smaller than the wavelength (λ) of a light guided through the at least one modal adapter (140), and the plurality of sections of core material (110) being arranged with progressive angles between a plane perpendicular to the propagation direction of the guided light and the angle (α); and
wherein the plurality of sections of core material (110) and the plurality of sections of covering material (120) have constant geometric properties throughout the length of the waveguide (100).

15. The waveguide (100) according to claim 14, wherein the at least one modal adapter (140) comprises a plurality of central attachments (141) of core material that joins the plurality of sections of core material (110) of said modal adapter (140), the width of each central bridge (141) being inversely proportional to the width of the modal adapter (140).

16. The waveguide (100) according to claim 14, wherein the sections of core material (210) of the at least one modal adapter (140) have a variable width.

17. The waveguide (100) according to claim 14, wherein the angle (α) is selected such that a first effective index ($n_{TE}$) of a zero-order transverse electric mode ($TE_0$) is different from a second effective index ($n_{TM}$) of a zero-order transverse magnetic mode ($TM_0$).

18. The waveguide (100) according to claim 14, wherein the angle (α) is selected such that a first effective index ($n_{TE}$) of a zero-order transverse electric mode ($TE_0$) is equal to a second effective index ($n_{TM}$) of a zero-order transverse magnetic mode ($TM_0$).

* * * * *